(12) United States Patent
Xin et al.

(10) Patent No.: US 9,780,849 B2
(45) Date of Patent: Oct. 3, 2017

(54) METHOD AND SYSTEM FOR PERFORMANCE TESTING

(75) Inventors: Yu Xin, Shenzhen (CN); Jia Ni, Shenzhen (CN); Luanjian Bian, Shenzhen (CN)

(73) Assignee: XI'AN ZHONGXING NEW SOFTWARE CO.LTD., Xi'An, Shaanxi (CN)

(*) Notice: Subject to any disclaimer, the term of this patent is extended or adjusted under 35 U.S.C. 154(b) by 679 days.

(21) Appl. No.: 14/375,900

(22) PCT Filed: Dec. 31, 2011

(86) PCT No.: PCT/CN2011/085107
§ 371 (c)(1),
(2), (4) Date: Jul. 31, 2014

(87) PCT Pub. No.: WO2012/155522
PCT Pub. Date: Nov. 22, 2012

(65) Prior Publication Data
US 2015/0249489 A1    Sep. 3, 2015

(30) Foreign Application Priority Data
Aug. 5, 2011 (CN) .......................... 2011 1 0223784

(51) Int. Cl.
H04W 24/02    (2009.01)
H04B 7/04     (2017.01)
H04B 7/0456   (2017.01)

(52) U.S. Cl.
CPC .......... *H04B 7/0456* (2013.01); *H04W 24/02* (2013.01)

(58) Field of Classification Search
None
See application file for complete search history.

(56) References Cited

U.S. PATENT DOCUMENTS 8,325,841 B2 * 12/2012 Lee ...................... H04B 7/0417
375/216
2002/0124036 A1 * 9/2002 Rawlins ................ G06F 17/141
708/422

(Continued)

FOREIGN PATENT DOCUMENTS

CN    101026442 A    8/2007
CN    101662319 A    3/2010

(Continued)

OTHER PUBLICATIONS

International Search Report for PCT/CN2011/085107 dated Mar. 29, 2012.

*Primary Examiner* — Hicham Foud
(74) *Attorney, Agent, or Firm* — Ling Wu; Stephen Yang; Ling and Yang Intellectual Property (57) ABSTRACT

Disclosed is a method and system for performance test. The method includes: configuring a static channel between a transmitting end and a receiving end in a system configured with M transmitting antenna ports and N receiving antennas, wherein singular values of a N*M channel matrix of the static channel are equal, wherein, M=4 and N=4; or M=8 and N=4; or M=8 and N=8. The transmitting end transmits data to the receiving end by the static channel. The above-mentioned technical solution can implement the performance test in 4 or 8 receiving antennas, and it can implement CQI reporting precision performance test of static channel in 4 or 8 receiving antennas.

20 Claims, 1 Drawing Sheet

(56) References Cited

U.S. PATENT DOCUMENTS

| | | | |
|---|---|---|---|
| 2004/0047426 A1* | 3/2004 | Nissani Nissensohn | H04L 25/0242 375/259 |
| 2004/0132414 A1 | 7/2004 | Sendyk et al. | |
| 2004/0192218 A1* | 9/2004 | Oprea | H04L 25/03343 455/73 |
| 2007/0211815 A1* | 9/2007 | Pan | H04B 7/0689 375/267 |
| 2008/0043873 A1* | 2/2008 | Ariyavisitakul | H04B 7/0617 375/267 |
| 2008/0240274 A1* | 10/2008 | Han | H04B 7/0417 375/260 |
| 2009/0147880 A1* | 6/2009 | Wennstrom | H04B 7/0634 375/267 |
| 2009/0307558 A1* | 12/2009 | Lee | H04B 7/0639 714/749 |
| 2011/0090981 A1* | 4/2011 | Lindgren | H04B 7/0689 375/267 |
| 2011/0096658 A1* | 4/2011 | Yang | H04L 5/0023 370/210 |
| 2011/0319027 A1* | 12/2011 | Sayana | H04B 7/0632 455/67.11 |
| 2012/0014473 A1* | 1/2012 | Heath, Jr. | H04L 25/03949 375/295 |
| 2012/0069926 A1* | 3/2012 | Park | H04B 7/063 375/267 |

FOREIGN PATENT DOCUMENTS

| | | |
|---|---|---|
| CN | 102291167 A | 12/2011 |
| DE | 102008055759 A1 | 5/2010 |

* cited by examiner

METHOD AND SYSTEM FOR PERFORMANCE TESTING

TECHNICAL FIELD

The patent document relates to the field of communication, and more particularly, to a method and system for performance test.

BACKGROUND OF THE INVENTION

Long-Term Evolution (LTE) system based on Orthogonal Frequency Division Multiplexing (OFDM) and Multiple Input Multiple Output (MIMO) antenna technology needs to meet some of minimum performance requirements in the industry. When the terminal has two receiving antennas, only under the condition of additive White Gaussian Noise (AWGN), that is, under the Static propagation condition, for the channel quality indicator (CQI) reporting performance test with minimum precision, the industry has some methods for configuring static channel or static propagation condition, including 2×2 (2 transmitting antennas and two receiving antennas), 4×2 (four transmitting antennas and two receiving antennas) and 8×2 (eight transmitting antennas and two receiving antennas) static channel configuration methods.

With the performance upgrading of the terminal products in future, there are more and more terminals with four or eight receiving antennas, there is, however, no method for CQI reporting performance test with minimum precision in this case, nor the corresponding static channel or static propagation condition configuration method, therefore, this problem is desired to be solved.

SUMMARY OF THE INVENTION

To solve the technical problem, the patent document provides a method and system for performance test to achieve performance test in four or eight receiving antennas.

To solve the abovementioned problem, the following technical solution is used:

a performance test method, comprising:

in a system configured with M transmitting antenna ports and N receiving antennas, configuring a static channel between a transmitting end and a receiving end, and singular values of a N*M channel matrix of said static channel are equal, wherein M=4 and N=4; alternatively, M=8 and N=4; alternatively, M=8 and N=8;

said transmitting end transmitting data to said receiving end by said static channel.

Wherein, when M=4 and N=4, said N*M channel matrix is a 4×4 channel matrix, and said 4×4 channel matrix is:

$$\begin{bmatrix} 1 & j & 1 & j \\ 1 & -j & 1 & -j \\ 1 & j & -1 & -j \\ 1 & -j & -1 & j \end{bmatrix};$$

or a matrix after any row swap and/or column swap operation is performed on $$\begin{bmatrix} 1 & j & 1 & j \\ 1 & -j & 1 & -j \\ 1 & j & -1 & -j \\ 1 & -j & -1 & j \end{bmatrix}.$$

Wherein, a precoding matrix used by said transmitting end to transmit data is fixed.

Wherein, when M=4 and N=4, said precoding matrix used by said transmitting end to transmit data in each sub-frame is selected randomly.

Wherein, when M=4 and N=4, said M transmitting antenna ports are 4 transmitting antenna ports, and said fixed precoding matrix or a randomly selected precoding matrix is selected from a codebook of said 4 transmitting antenna ports.

Wherein, when M=8 and N=4, said N*M channel matrix is a 4×8 channel matrix, and said 4×8 channel matrix is as follows:

$$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix};$$

or a matrix obtained after any row swap and/or column swap operation is performed on $$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}.$$

Wherein, when M=8 and N=4, said M transmitting antenna ports are 8 transmitting antenna ports, and said fixed precoding matrix is selected from the codebook of said 8 transmitting antenna ports.

Wherein, when M=8 and N=4, said M transmitting antenna ports are 8 transmitting antennas ports, and the precoding matrix used by said transmitting end to transmit data is a precoding matrix fed back by said receiving end.

Wherein, the precoding matrix fed back by said receiving end is selected from the codebook of said 8 transmitting antenna ports.

Wherein, when M=8 and N=8, said N*M channel matrix is an 8×8 channel matrix, and said 8×8 channel matrix is:

$$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix};$$

or a matrix obtained after any row swap and/or column swap operation is performed on $$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}.$$

Wherein, when M=8 and N=8, said fixed precoding matrix is a precoding matrix preset in the system.

Wherein, when M=8 and N=8, said fixed precoding matrix is a unit matrix.

Wherein, when M=8 and N=8, said transmitting end does not use the precoding matrix when transmitting data.

Wherein, each transmitting antenna port corresponds to one or more physical antennas, and each receiving antenna corresponds to one or more physical antennas.

Wherein, said performance test is a CQI reporting precision test.

A performance test system, comprising: a transmitting end and a static channel configuration device, wherein:

said static channel configuration device is configured to: configure a static channel between a transmitting end and a receiving end, wherein singular values of a N*M channel matrix of said static channel are equal, wherein, M is the number of transmitting antenna ports included in said transmitting end, N is the number of receiving antennas included in said receiving end, wherein, M=4 and N=4; alternatively, M=8 and N=4; alternatively, M=8 and N=8;

said transmitting end is configured to: during a performance test, transmit data to said receiving end by said static channel.

Wherein, said transmitting end is further configured to: use a fixed precoding matrix to transmit data.

Wherein, said static channel configuration device is further configured to: when M=4 and N=4, configure said N*M channel matrix as a 4×4 channel matrix, and said 4×4 channel matrix is:

$$\begin{bmatrix} 1 & j & 1 & j \\ 1 & -j & 1 & -j \\ 1 & j & -1 & -j \\ 1 & -j & -1 & j \end{bmatrix};$$

or
a matrix obtained after any row swap and/or column swap operation is performed on $$\begin{bmatrix} 1 & j & 1 & j \\ 1 & -j & 1 & -j \\ 1 & j & -1 & -j \\ 1 & -j & -1 & j \end{bmatrix}.$$

Wherein, said transmitting end is further configured to: when M=4 and N=4, use a randomly selected precoding matrix to transmit data in each sub-frame.

Wherein, when M=4 and N=4, said transmitting antenna ports are 4 transmitting antenna port, said fixed precoding matrix or randomly selected precoding matrix is selected from the codebook of said 4 transmitting antenna ports.

Wherein, said static channel configuration device is further configured to: when M=8 and N=4, configure said N*M channel matrix as a 4×8 channel matrix, and said 4×8 channel matrix is:

$$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix};$$

or
a matrix obtained after any row swap and/or column swap operation is performed on $$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}.$$

Wherein, when M=8 and N=4, said transmitting antenna ports are 8 transmitting antenna ports;

said transmitting end is further configured to: select one matrix from the codebook of said 8 transmitting antenna ports as said fixed precoding matrix.

Wherein, said transmitting end is further configured to: when M=8 and N=4, use the precoding matrix fed back by said receiving end as the precoding matrix used for transmitting data.

Wherein, said static channel configuration device is further configured to: when M=8 and N=8, configure said N*M channel matrix as an 8×8 channel matrix, and said 8×8 channel matrix is:

$$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix};$$

or
a matrix obtained after any row swap and/or column swap operation is performed on $$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}.$$

Wherein, when M=8 and N=8, said fixed precoding matrix is a precoding matrix preset in the system.

Wherein, when M=8 and N=8, said fixed precoding matrix is a unit matrix.

Wherein, when M=8 and N=8, said transmitting end does not use the precoding matrix when transmitting the data.

Wherein, each transmitting antenna port of said transmitting end corresponds to one or more physical antennas.

Wherein, said performance test is a CQI reporting precision test.

The abovementioned technical solution may implement performance test in four or eight receiving antennas.

PREFERRED EMBODIMENTS OF THE PRESENT INVENTION

To make objectives, technical solutions and advantages of the patent document understood more clearly, hereinafter, the embodiments of the present invention will be described in detail with combination of accompanying drawings. It should be noted that, in the case of no conflict, the embodiments and features in the embodiments of present application may be arbitrarily combined with each other.

Figure 1:
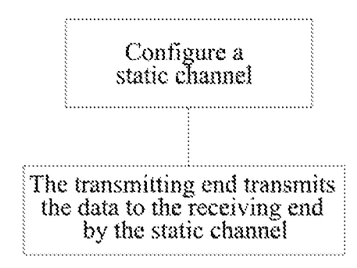
FIG. 1 is a flow chart of performance test method in accordance with an embodiment of the present invention.

The embodiment of the present invention provides a performance test method, as shown in FIG. 1, comprising:

in a system configured with M transmitting antenna ports and N receiving antennas, a static channel is configured between the transmitting end and the receiving end, singular values of a N*M channel matrix of said static channel are equal, wherein M=4 and N=4; alternatively, M=8 and N=4; alternatively, M=8 and N=8;

said transmitting end transmits data to said receiving end by said static channel, In the following, each scenario will be described respectively.

For a LTE system configured with 4×4 antennas, in performance test under the condition of AWGN, the data transmitted by said transmitting end go through said static channel and then are received by said receiving end, and said channel matrix used by said static channel (or static propagation condition) is:

$$\begin{bmatrix} 1 & j & 1 & j \\ 1 & -j & 1 & -j \\ 1 & j & -1 & -j \\ 1 & -j & -1 & j \end{bmatrix},$$

or a matrix obtained after any row swap and/or column swap operation is performed on $$\begin{bmatrix} 1 & j & 1 & j \\ 1 & -j & 1 & -j \\ 1 & j & -1 & -j \\ 1 & -j & -1 & j \end{bmatrix}.$$

Wherein, said LTE system configured with 4×4 antennas comprises four transmitting antenna ports, and each transmitting antenna port corresponds to one or more physical antennas.

Wherein, said LTE system configured with 4×4 antennas comprises four receiving antennas, and each receiving antenna corresponds to one or more physical antennas.

Wherein, said AWGN condition is the static channel propagation condition, and under this condition, the channel coefficient does not change with time, and the data received by the receiving end are affected by additive Gaussian white noise.

Wherein, said performance test is a CQI reporting precision test.

Wherein, said precoding used by said transmitting end to transmit data is a fixed precoding matrix, or, the precoding matrix used by said transmitting end to transmit data in each sub-frame is selected randomly.

Wherein, when using the fixed precoding matrix, said precoding matrix is determined by the CodeBookSubsetRestriction bitmap.

Wherein, one 4×4 precoding matrix is selected randomly from the codebook of the four transmitting antenna ports as the fixed precoding matrix.

Wherein, the precoding matrix used by said transmitting end to transmit data is a 4×4 precoding matrix randomly selected from the codebook of the four transmitting antenna ports, and the random selection is performed once by taking each downlink sub-frame as the time interval.

Wherein, the Modulation Coding Scheme (MCS) used by said transmitting end to transmit data is associated with the CQI fed back by said receiving end.

Wherein, after said receiving end receives the data, it demodulates the data and calculates out the bit error rate.

For a LTE system configured with 8×4 antennas, in the performance test under the condition of AWGN, the data transmitted by said transmitting end go through the static channel and are received by said receiving end, and the channel matrix used by said static channel (or static propagation conditions) is designed as follows:

$$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix},$$

or a matrix obtained after any row swap and/or column swap operation is performed on $$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}.$$

Wherein, said LTE system configured with 8×4 antennas comprises eight transmitting antenna ports, and each transmitting antenna port corresponds to one or more physical antennas.

Wherein, said LTE system configured with 8×4 antennas comprises four receiving antennas, and each receiving antenna corresponds to one or more physical antennas.

Wherein, said AWGN condition is the static channel propagation condition, and under this condition, the channel coefficient does not change with time, and the data received by said receiving end are affected by the additive Gaussian white noise.

Wherein, said performance test is the CQI reporting precision test.

Wherein, the precoding used by said transmitting end to transmit data is a fixed precoding matrix, and said precoding matrix is determined by the CodeBookSubsetRestriction bitmap.

Wherein, one precoding matrix is selected from the codebook of the 8 transmitting antenna ports as the abovementioned fixed precoding matrix.

Wherein, the precoding matrix used by said transmitting end to transmit data is the precoding matrix fed back by said receiving end.

Wherein, said receiving end selects a precoding matrix from the codebook of the 8 transmitting antenna ports as the abovementioned fed-back precoding.

Wherein, the Modulation Coding Scheme (MCS) used by said transmitting end to transmit data is associated with the CQI fed back by said receiving end.

Wherein, after said receiving end receives the data, it demodulates the data and then calculates out the bit error rate.

For a LTE system configured with 8×8 antennas, in the performance test under the condition of AWGN, the data transmitted by said transmitting end go through said static channel and then are received by said receiving end, and the channel matrix used by said static channel (or static propagation conditions) is designed as follows:

$$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix},$$

or a matrix obtained after any row swap and/or column swap operation is performed on $$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}.$$

Wherein, said LTE system configured with 8×8 antennas comprises eight transmitting antenna ports, and each transmitting antenna port corresponds to one or more physical antennas.

Wherein, said LTE system configured with 8×8 antennas comprises eight receiving antennas, and each receiving antenna corresponds to one or more physical antennas.

Wherein, said AWGN condition is the static channel propagation condition, and under this condition, the channel coefficient does not change with time, and the data received by said receiving end are affected by the additive Gaussian white noise.

Wherein, said performance test is the CQI reporting precision test.

Wherein, the precoding used by said transmitting end to transmit data is a fixed precoding matrix.

Wherein, said fixed precoding matrix is a precoding matrix preset in the system.

Wherein, said fixed precoding matrix is a unit matrix.

Wherein, said transmitting end does not use the precoding matrix when transmitting data.

Wherein, the Modulation Coding Scheme (MCS) by said transmitting end to transmit data is associated with the CQI fed back by said receiving end.

Wherein, after said receiving end receives the data, it demodulates the data and then calculates out the bit error rate.

The embodiment of the present invention provides static channel configuration method in three scenarios (4×4, 8×4 and 8×8), and the specific implementations of the three scenarios are described respectively as follows:

(1) For the LTE system configured with 4×4 antennas, in the performance test under the condition of AWGN, the data transmitted by said transmitting end go through the static channel and are received by said receiving end, and the channel matrix used by said static channel (or static propagation conditions) is designed as follows:

$$H = \begin{bmatrix} 1 & j & 1 & j \\ 1 & -j & 1 & -j \\ 1 & j & -1 & -j \\ 1 & -j & -1 & j \end{bmatrix}$$

the feature of this matrix is that: 4 singular values of this matrix are equal, and they are all equal to 2. Take this matrix to represent the static channel, the data of said transmitting end can be transmitted by using four layer spatial multiplexing mode, and after transmitted in said static channel, the signal to noise ratio of the four-layer spatially multiplexed data in the receiving end is equal. Furthermore, during the performance test, even if there is phase deviation in the transmitting antennas, the four singular values of said matrix are still equal.

Since the four singular values of the 4×4 static channel matrix are equal, any one 4×4 unitary matrix is the matching precoding of said static channel, that is, said transmitting end can randomly select one 4×4 precoding matrix from the codebook set of 4 transmitting antenna ports in the LTE standard protocol as the precoding of transmitting data. These four-layer data received by said receiving end are completely orthogonal, and there is no inter-layer interference.

Since the 4-layer data are completely orthogonal and there is no inter-layer interference, it is able to simultaneously and independently test the CQI reporting precision of two codeword streams. Therefore, it does not need to perform the CQI reporting precision test of the single codeword stream.

There are two specific methods of precoding used by said transmitting end to transmit data: 1) randomly selecting one 4×4 precoding matrix from the codebook of the 4 the transmitting antenna ports as a fixed precoding, and the fixed precoding matrix is determined by the CodeBookSubsetRestriction bitmap; 2) randomly selecting one 4×4 precoding matrix from the codebook of the 4 transmitting antenna ports, and the random selection is performed once by taking each downlink sub-frame as the time interval.

The abovementioned 4×4 antenna configuration can be the 4×4 virtual antenna configuration. That is, the four transmitting antennas may be four antenna ports, and each transmitting antenna port corresponds to one or more physical antennas. Similarly, the four receiving antennas may be that: each receiving antenna corresponds to one or more physical antennas.

The abovementioned AWGN condition is the static channel propagation condition, and under this condition, the channel coefficient does not change with time, and the data received by said receiving end are affected by the additive Gaussian white noise. Herein, the interference from other cells or users is not considered.

The abovementioned performance test is the CQI reporting precision test under the static channel propagation condition. For other performance tests in the LTE system, if it needs the static channel propagation condition, it can also use the channel matrix designed in the patent document.

The modulation coding scheme (MCS) used by said transmitting end to transmit data is associated with the CQI fed back by said receiving end. Specifically, after said transmitting end receives the CQI values fed back by said receiving end, a plurality of CQI values is averaged to obtain the Median CQI, and then the corresponding MCS is determined according to the Median CQI, and then said transmitting end uses the corresponding MCS to transmit the data.

After said receiving end receives the data using the corresponding MCS, it demodulates said data and then calculates the bit error rate. This bit error rate is required to meet the desired bit error rate of the performance test, so as to verify the CQI reporting precision of said receiving end.

(2) For the LTE system configured with 8×4 antennas, in the performance test under the condition of AWGN, the data transmitted by said transmitting end are received by said receiving end after going through said static channel, and said channel matrix used by said static channel (or static propagation conditions) is designed as follows:

$$H = \begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}$$

The feature of this matrix is that: the four singular values of said matrix are equal and all equal to $\sqrt{8}$. Take this matrix to represent the static channel, the data of said transmitting end can be transmitted in the 4-layer spatial multiplexing mode, and after transmitted in said static channel, the signal to noise ratio (SNR) of the four-layer spatially multiplexed data in said receiving end is equal.

Since the singular values of the matrix will not be changed when the rows or the columns of the channel matrix swap their positions arbitrarily, the channel matrix used by said static channel can be a matrix after any row position swap and/or column position swap operation is performed on said channel matrix.

Said transmitting end may select one 8×4 precoding matrix matching the channel matrix from the codebook set of the 8 transmitting antenna ports in the LTE standard protocol as the fixed precoding of transmitting data, therefore, these four-layer data received by said receiving end are completely orthogonal, and there is no inter-layer interference. The fixed precoding matrix used by said transmitting end to transmit data is determined by the field of CodeBookSubsetRestriction bitmap.

Since the transmitting antennas have phase deviation during the performance test and the phase deviation may also be changing constantly, the static channel configured by the 8×4 antennas also changes. In order to ensure that the 4-layer data are orthogonal as much as possible, the precoding used by said transmitting end to transmit data can be the precoding fed back by said receiving end. Said receiving end selects one precoding matrix from the codebook of the 8 transmitting antenna ports as the abovementioned fed-back precoding.

Since the 4-layer data are generally orthogonal and there is no inter-layer interference, or the inter-layer interference is very small, it is able to simultaneously and independently test the CQI reporting precision of two codeword streams. Therefore, there is no need to perform the CQI reporting precision test of the single codeword stream any longer.

The abovementioned 8×4 antenna configurations can be 8×4 virtual antenna configuration. That is, the eight transmitting antennas may be eight antenna ports, and each transmitting antenna port corresponds to one or more physical antennas. Similarly, the four receiving antennas may be that, each receiving antenna corresponds to one or more physical antennas.

The abovementioned AWGN condition is the static channel propagation condition, and under this condition, the channel coefficient does not change with time, the data received by said receiving end are affected by the additive Gaussian white noise. Herein, the interference from other cells or users is not considered.

The abovementioned performance test is aiming at the CQI reporting precision test under the static channel propagation condition. For other performance tests in the LTE system, if it needs the static channel propagation condition, it can also use the channel matrix designed in the patent document.

The modulation coding scheme (MCS) used by said transmitting end to transmit data is associated with the CQI fed back by said receiving end. Specifically, after said transmitting end receives the CQI values fed back by said receiving end, a plurality of CQI values is averaged to obtain the Median CQI, and the corresponding MCS is determined according to the Median CQI, and then said transmitting end uses the corresponding MCS to transmit the data.

After said receiving end receives the data using the corresponding MCS, it demodulates said data and then calculates the bit error rate. Said bit error rate is required to meet the desired bit error rate of the performance test to verify the precision of CQI report of said receiving end.

(3) For the LTE system configured with 8×8 antennas, in the performance test under the condition of AWGN, the data transmitted by said transmitting end are received by said receiving end after going through said static channel, and the channel matrix used by said static channel (or static propagation conditions) is designed as follows:

$$H = \begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}$$

The feature of this matrix is that: the eight singular values of this matrix are equal and all equal to $\sqrt{8}$. Take this matrix to represent the static channel, the data of said transmitting end can be transmitted by using the 8-layer spatial multiplexing mode, and after the eight-layer spatially multiplexed data are transmitted in said static channel, the SNR of the eight-layer spatially multiplexed data in said receiving end is equal. Furthermore, during the performance test, even if there is phase deviation in the transmitting antennas, the eight singular values of said matrix are still equal.

Since the rows or the columns of the channel matrix can swap their positions arbitrarily without changing the singular values of the matrix, the channel matrix used by said static channel can be a matrix after any row position swap and/or column position swap operation is performed on said channel matrix.

Since the eight singular values of the 8×8 static channel matrix are equal, any one 8×8 unitary matrix is a matching precoding. Therefore, while transmitting data, said transmitting end can use the precoding preset in the system, or do not use precoding, or use a unit matrix as the precoding. This 8-layer data received by said receiving end are completely orthogonal and there is no inter-layer interference.

Since the 8-layer data is completely orthogonal and there is no inter-layer interference, it is able to simultaneously and independently test the CQI reporting precision of two codeword streams. Therefore, there is no need to perform the CQI reporting precision test of the single codeword stream any longer.

The abovementioned 8×8 antenna configuration can be 8×8 virtual antenna configuration. That is, the eight transmitting antennas may be eight antenna ports, and each transmitting antenna port corresponds to one or more physical antennas. Similarly, the eight receiving antennas may be that: each receiving antenna corresponds to one or more physical antennas.

The abovementioned AWGN condition is the static channel propagation condition, and under this condition, the channel coefficient does not change with time, and the data received by said receiving end are affected by the additive Gaussian white noise. Herein, the interference from other cells or users is not considered.

The abovementioned performance test is aiming at the CQI reporting precision test under the channel propagation static condition. For other performance tests in the LTE system, if it needs the static channel propagation condition, it can also use the channel matrix designed in the patent document.

The modulation coding scheme (MCS) used by said transmitting end to transmit data is associated with the CQI fed back by said receiving end. Specifically, after said transmitting end receives the CQI values fed back by said receiving end, a plurality of CQI values are averaged to obtain the Median CQI, and then the corresponding MCS is determined according to the Median CQI, and then said transmitting end uses the corresponding MCS to transmit data.

After said receiving end receives the data using the corresponding MCS, it demodulates said data and then calculates the bit error rate. This bit error rate is required to meet the desired bit error rate of the performance test, so as to verify the precision of CQI report of said receiving end.

The embodiment of the present invention also provides a performance test system, comprising a transmitting end and a static channel configuration device, wherein:

said static channel configuration device is configured to: configure a static channel between said transmitting end and said receiving end, wherein the singular values of the N*M channel matrix of said static channel are equal, wherein, M is the number of transmitting antenna ports included in said transmitting end, and N is the number of receiving antennas included in said receiving end, wherein M=4 and N=4; alternatively, M=8 and N=4; alternatively, M=8 and N=8;

said transmitting end is configured to: during a performance test, transmit the data to said receiving end by the static channel.

Wherein, said transmitting end is further configured to: use a fixed precoding matrix to transmit data.

Wherein, said static channel configuration unit is configured to: when M=4 and N=4, configure said 4×4 channel matrix as:

$$\begin{bmatrix} 1 & j & 1 & j \\ 1 & -j & 1 & -j \\ 1 & j & -1 & -j \\ 1 & -j & -1 & j \end{bmatrix},$$

or a matrix obtained after any row swap and/or column swap operation is performed on $$\begin{bmatrix} 1 & j & 1 & j \\ 1 & -j & 1 & -j \\ 1 & j & -1 & -j \\ 1 & -j & -1 & j \end{bmatrix}.$$

Wherein, said transmitting end is further configured to: when M=4 and N=4, use a randomly selected precoding matrix to transmit data in each sub-frame.

Wherein, when M=4 and N=4, said fixed precoding matrix or randomly selected precoding matrix is selected from the codebook of the four transmitting antenna ports.

Wherein, said static channel configuration device is configured to: when M=8 and N=4, configure said 4×8 channel matrix as:

$$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix},$$

or a matrix obtained after any row swap and/or column swap operation is performed on $$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}.$$

Wherein, said transmitting end can be further configured to: when M=8 and N=4, select one matrix from the codebook of said eight transmitting antenna ports as said fixed precoding matrix.

Wherein, said transmitting end is further configured to: when M=8 and N=4, use the precoding matrix fed back by said receiving end as the precoding matrix used for transmitting data.

Wherein, said static channel configuration device is further configured to: when M=8 and N=8, configure said 8×8 channel matrix as:

$$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix},$$

or a matrix obtained after any row swap and/or column swap operation is performed on $$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}.$$

Wherein when M=8 and N=8, said fixed precoding matrix is a precoding matrix preset in the system.

Wherein, when M=8 and N=8, said fixed precoding matrix is a unit matrix.

Wherein, when M=8 and N=8, said transmitting end does not use the precoding matrix when transmitting the data.

Wherein, each transmitting antenna port of said transmitting end corresponds to one or more physical antennas.

Wherein, said performance test is the CQI reporting precision test.

Those ordinarily skilled in the art can understand that all or some of steps of the above-mentioned method may be completed by the programs instructing the relevant hardware, and said programs may be stored in a computer-readable storage medium, such as read only memory, magnetic or optical disk. Optionally, all or some of the steps of the above-mentioned embodiments may also be implemented by using one or more integrated circuits. Accordingly, each module/unit in the abovementioned embodiment may be realized in the form of hardware or software function module. The patent document is not limited to any specific form of hardware and software combinations.

The above description is only the preferred embodiments of the present invention and is not intended to limit the patent document, and for the person skilled in the field, the patent document may also have a variety of changes and modifications, and without departing from the spirit and essence of the patent document, these corresponding changes and modifications and so on should belong to the protection scope of the patent document.

INDUSTRIAL APPLICABILITY

The abovementioned technical solution can implement the performance test in four or eight receiving antennas, and it can implement the CQI reporting accuracy performance test of the static channel in 4 or 8 receiving antennas. Therefore, the patent document has very strong industrial applicability.

What is claimed is:

1. A performance test method, comprising:
configuring a static channel between a transmitting end and a receiving end in a system configured with M transmitting antenna ports and N receiving antennas, and wherein singular values of a N*M channel matrix of said static channel are equal, wherein the M=4 and the N=4; or the M=8 and the N=4; or the M=8 and the N=8;
transmitting data to said receiving end from said transmitting end by said static channel;
wherein under condition of additive white gaussian noise, channel coefficient of the static channel is constant, and the data received by said receiving end are affected by the additive gaussian white noise;
wherein the performance test comprises a channel quality indicator (CQI) reporting precision test, modulation coding scheme (MCS) used by said transmitting end to transmit the data is associated with CQI values fed back by said receiving end;
wherein, when the M=4 and the N=4, said N*M channel matrix is a 4×4 channel matrix, and said 4×4 channel matrix whose four-layer data received by said receiving end are orthogonal is represented as follows:

$$\begin{bmatrix} 1 & j & 1 & j \\ 1 & -j & 1 & -j \\ 1 & j & -1 & -j \\ 1 & -j & -1 & j \end{bmatrix};$$

or
a matrix obtained after any row swap or column swap operation is performed on $$\begin{bmatrix} 1 & j & 1 & j \\ 1 & -j & 1 & -j \\ 1 & j & -1 & -j \\ 1 & -j & -1 & j \end{bmatrix}.$$

2. The performance test method of claim 1, wherein, when the M=8 and the N=4, said N*M channel matrix is a 4×8 channel matrix, and said 4×8 channel matrix is as follows:

$$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix};$$

or
a matrix obtained after any row swap or column swap operation is performed on $$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}.$$

3. The performance test method of claim 1, wherein, a precoding matrix used by said transmitting end to transmit data is fixed.

4. The performance test method of claim 3, wherein, when the M=4 and the N=4, said M transmitting antenna ports are 4 transmitting antenna ports, and said fixed precoding matrix is selected from a codebook of said 4 transmitting antenna ports;

or when the M=8 and the N=4, said M transmitting antenna ports are 8 transmitting antenna ports, and said fixed precoding matrix is selected from a codebook of said 8 transmitting antenna ports.

5. The performance test method of claim 3, wherein, when the M=8 and the N=8, said fixed precoding matrix is a precoding matrix preset in a system;

or when the M=8 and the N=8, said fixed precoding matrix is a unit matrix.

6. The performance test method of claim 1, wherein, when the M=4 and the N=4, a precoding matrix used by said transmitting end to transmit data in each sub-frame is selected randomly, when the M=4 and the N=4, said M transmitting antenna ports are 4 transmitting antenna ports, and said randomly selected precoding matrix is selected from a codebook of said 4 transmitting antenna ports.

7. The performance test method of claim 1, wherein, when the M=8 and the N=4, said M transmitting antenna ports are 8 transmitting antennas ports, and a precoding matrix used by said transmitting end to transmit data is a precoding matrix fed back by said receiving end, the precoding matrix fed back by said receiving end is selected from a codebook of said 8 transmitting antenna ports.

8. The performance test method of claim 1, wherein, when the M=8 and the N=8, said N*M channel matrix is an 8×8 channel matrix, and said 8×8 channel matrix is:

$$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix};$$

or a matrix obtained after any row swap or column swap operation is performed on $$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}.$$

9. The performance test method of claim 1, wherein, when the M=8 and the N=8, said transmitting end does not use a precoding matrix when transmitting data.

10. The performance test method of claim 1, wherein, each transmitting antenna port corresponds to one or more physical antennas, and each receiving antenna corresponds to one or more physical antennas.

11. A performance test system, comprising: a transmitting end and a static channel configuration device, wherein:

said static channel configuration device stores in a non-transitory computer readable storage medium thereof computer program code that causes a processor thereof to: configure a static channel between the transmitting end and a receiving end, singular values of a N*M channel matrix of said static channel being equal, wherein, M is the number of transmitting antenna ports included in said transmitting end, N is the number of receiving antennas included in said receiving end, wherein, the M=4 and the N=4; or the M=8 and the N=4; or the M=8 and the N=8;

said transmitting end stores in a non-transitory computer readable storage medium thereof computer program code that causes a processor thereof to: during a performance test, transmit data to said receiving end by said static channel;

wherein under condition of additive white gaussian noise, channel coefficient of the static channel is constant, and the data received by said receiving end are affected by the additive gaussian white noise;

wherein the performance test comprises a channel quality indicator (CQI) reporting precision test, modulation coding scheme (MCS) used by said transmitting end to transmit the data is associated with CQI values fed back by said receiving end;

wherein, when the M=4 and the N=4, said N*M channel matrix is a 4×4 channel matrix, and said 4×4 channel matrix whose four-layer data received by said receiving end are orthogonal is represented as follows:

$$\begin{bmatrix} 1 & j & 1 & j \\ 1 & -j & 1 & -j \\ 1 & j & -1 & -j \\ 1 & -j & -1 & j \end{bmatrix};$$

or a matrix obtained after any row swap or column swap operation is performed on $$\begin{bmatrix} 1 & j & 1 & j \\ 1 & -j & 1 & -j \\ 1 & j & -1 & -j \\ 1 & -j & -1 & j \end{bmatrix}.$$

12. The performance test system of claim 11, wherein, said transmitting end stores in the non-transitory computer readable storage medium thereof the computer program code that further causes the processor thereof to: use a fixed precoding matrix to transmit data.

13. The performance test system of claim 12, wherein, when the M=4 and the N=4, said transmitting antenna ports are 4 transmitting antenna port, and said fixed precoding matrix is selected from a codebook of said 4 transmitting antenna ports;

or when the M=8 and the N=4, said transmitting antenna ports are 8 transmitting antenna ports;

said transmitting end stores in the non-transitory computer readable storage medium thereof the computer program code that further causes the processor thereof to: select one matrix from a codebook of said 8 transmitting antenna ports as said fixed precoding matrix.

14. The performance test system of claim 12, wherein, when the M=8 and the N=8, said fixed precoding matrix is a precoding matrix preset in a system;
or
when the M=8 and the N=8, said fixed precoding matrix is a unit matrix.

15. The performance test system of claim 11, wherein, when the M=8 and the N=4, said N*M channel matrix is a 4×8 channel matrix, said 4×8 channel matrix being:

$$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix};$$

or
a matrix obtained after any row swap or column swap operation is performed on $$\begin{bmatrix} 1 & 1 & j & j & 1 & 1 & j & j \\ 1 & 1 & -j & -j & 1 & 1 & -j & -j \\ 1 & 1 & j & j & -1 & -1 & -j & -j \\ 1 & 1 & -j & -j & -1 & -1 & j & j \end{bmatrix}.$$

16. The performance test system of claim 11, wherein, said transmitting end stores in the non-transitory computer readable storage medium thereof the computer program code that further causes the processor thereof to: when the M=4 and the N=4, use a randomly selected precoding matrix to transmit data in each sub-frame, when the M=4 and the N=4, said transmitting antenna ports are 4 transmitting antenna port, and said randomly selected precoding matrix is selected from a codebook of said 4 transmitting antenna ports.

17. The performance test system of claim 11, wherein, said transmitting end stores in the non-transitory computer readable storage medium thereof the computer program code that further causes the processor thereof to: when the M=8 and the N=4, use a precoding matrix fed back by said receiving end as a precoding matrix used for transmitting data.

18. The performance test system of claim 11, wherein, when the M=8 and the N=8, said N*M channel matrix is an 8×8 channel matrix, said 8×8 channel matrix being:

$$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix};$$

or
a matrix obtained after any row swap or column swap operation is performed on $$\begin{bmatrix} 1 & j & 1 & j & 1 & j & 1 & j \\ 1 & -j & 1 & -j & 1 & -j & 1 & -j \\ 1 & j & -1 & -j & 1 & j & -1 & -j \\ 1 & -j & -1 & j & 1 & -j & -1 & j \\ 1 & j & 1 & j & -1 & -j & -1 & -j \\ 1 & -j & 1 & -j & -1 & j & -1 & j \\ 1 & j & -1 & -j & -1 & -j & 1 & j \\ 1 & -j & -1 & j & -1 & j & 1 & -j \end{bmatrix}.$$

19. The performance test system of claim 11, wherein, when the M=8 and the N=8, said transmitting end does not use a precoding matrix when transmitting data.

20. The performance test system of claim 11, wherein, each transmitting antenna port of said transmitting end corresponds to one or more physical antennas.

* * * * *